United States Patent
Gao

(10) Patent No.: US 7,294,248 B2
(45) Date of Patent: Nov. 13, 2007

(54) FABRICATION AND ACTIVATION PROCESSES FOR NANOSTRUCTURE COMPOSITE FIELD EMISSION CATHODES

(75) Inventor: Bo Gao, Burlington, NC (US)

(73) Assignee: Xintek, Inc., Research Triangle Park, NC (US)

( * ) Notice: Subject to any disclaimer, the term of this patent is extended or adjusted under 35 U.S.C. 154(b) by 778 days.

(21) Appl. No.: 10/610,591

(22) Filed: Jul. 2, 2003

(65) Prior Publication Data

US 2004/0108298 A1   Jun. 10, 2004

Related U.S. Application Data

(60) Provisional application No. 60/393,097, filed on Jul. 3, 2002.

(51) Int. Cl.
    C25D 13/02   (2006.01)
    C25F 3/02    (2006.01)
(52) U.S. Cl. .................. 204/491; 204/490; 204/485; 204/486; 205/656
(58) Field of Classification Search ......... 204/491, 204/490, 485, 486; 205/656
    See application file for complete search history.

(56) References Cited

U.S. PATENT DOCUMENTS

| 5,997,832 | A | 12/1999 | Lieber et al. |
| 6,250,984 | B1 | 6/2001 | Jin et al. |
| 6,340,822 | B1 * | 1/2002 | Brown et al. ............. 257/25 |
| 6,385,292 | B1 | 5/2002 | Dunham et al. |
| 6,456,691 | B2 | 9/2002 | Takahashi et al. |
| 6,553,096 | B1 | 4/2003 | Zhou et al. |
| 6,630,772 | B1 | 10/2003 | Bower et al. |
| 6,902,658 | B2 * | 6/2005 | Talin et al. ............. 204/484 |
| 2002/0014036 | A1 | 2/2002 | Chandaria |
| 2002/0094064 | A1 | 7/2002 | Zhou et al. |

FOREIGN PATENT DOCUMENTS

EP    0989579 A2 *   3/2000

OTHER PUBLICATIONS

U.S. Appl. No. 09/351,537, filed Jul. 1, 1999, Bower et al.
U.S. Appl. No. 10/358,160, filed Feb. 5, 2003, Lu et al.
U.S. Appl. No. 10/448,144, filed May 30, 2003, Qui et al.
U.S. Appl. No. 10/464,440, filed Jun. 19, 2003, Gao.
International Search Report for PCT/US03/20818 dated Dec. 15, 2006.

* cited by examiner

Primary Examiner—Kishor Mayekar
(74) Attorney, Agent, or Firm—Jenkins, Wilson, Taylor & Hunt, P.A.

(57) ABSTRACT

A method of forming an electron emitter includes the steps of: (i) forming a nanostructure-containing material; (ii) forming a mixture of nanostructure-containing material and a matrix material; (iii) depositing a layer of the mixture onto at least a portion of at least one surface of a substrate by electrophoretic deposition; (iv) sintering or melting the layer thereby forming a composite; and (v) electrochemically etching the composite to remove matrix material from a surface thereof, thereby exposing nanostructure-containing material.

25 Claims, 8 Drawing Sheets

FABRICATION AND ACTIVATION PROCESSES FOR NANOSTRUCTURE COMPOSITE FIELD EMISSION CATHODES

This application claims priority under 35 U.S.C. 119 to U.S. Provisional Application No. 60/393,097 entitled "Fabrication and Activation Processes of Field Emission Cathodes Composed of Carbon Nanotubes/Metal Composites", and filed on Jul. 3, 2002, the entire content of which is incorporated herein by reference

FIELD OF THE INVENTION

The present invention is directed to improved techniques for the formation field emission structures and devices that incorporate nanostructure-containing material, as well as treatments to improve the performance thereof. The present invention is also directed to associated structures and devices.

BACKGROUND OF THE INVENTION

Various constructions and techniques will be described below. However, nothing described herein should be construed as an admission of prior art. To the contrary, Applicants expressly reserve the right to demonstrate, where appropriate, that anything described herein does not qualify as prior art under the applicable statutory provisions.

The term "nanostructure" material is used by those familiar with the art to designate materials including nanoparticles such as $C_{60}$ fullerenes, fullerene-type concentric graphitic particles, metal, compound semiconductors such as CdSe, InP; nanowires/nanorods such as Si, Ge, $SiO_x$, $GeO_x$, or nanotubes composed of either single or multiple elements such as carbon, $B_xN_y$, $C_xB_yN_z$, $MoS_2$, and $WS_2$. One of the common features of nanostructure materials is their basic building blocks. A single nanoparticle or a carbon nanotube has a dimension that is less than 500 nm at least in one direction. These types of materials have been shown to exhibit certain properties that have raised interest in a variety of applications and processes.

Nanostructures, such as carbon nanotubes, are known to be excellent electron field emitters due to their unique geometry, extremely high mechanical strength, and good chemical and thermal stability. Experiments have shown that they have a low threshold field for electron emission (~1-2V/μm) and are capable of emitting at very high current densities.

However, due to materials issues such as poor film uniformity and insufficient adhesion and electrical conductivity between carbon nanotubes and the substrate, high stable emission current has not been obtained from macroscopic carbon nanotube-containing structures and devices, which has limited their practical utilization.

Among all the available techniques for synthesizing carbon nanotubes, laser-ablation and arc-discharge methods produce carbon nanotubes with a high level of structural perfection and therefore amongst the best electron field-emission properties. However, materials made therefrom are in the form of either porous membranes or powders that are not easily incorporated into field-emission devices such as cathodes, and therefore cannot be used directly on devices without further processing. Although the chemical vapor deposition (CVD) methods can grow carbon nanotubes directly on substrates, they require very high temperatures (600-1000° C.) and a reactive environment. Also, CVD grown carbon nanotubes generally do not have the same level of structural perfection and, as a result, lack the same emission properties as the tubes made by laser-ablation or arc-discharge methods. To fully utilize the excellent electron field-emission properties of carbon nanotubes, especially single wall carbon nanotubes made by laser-ablation and arc-discharge methods, some deposition techniques have been developed.

In addition, the nanotubes contained in powders or soot formed by laser-ablation and arc-discharge methods are randomly oriented. However, when utilized as sources for electron emission, it is advantageous to orient the tips of the nanotubes in the same direction, such as toward a common emission target. Thus, the normal lack of orientation of the nanotubes presents and additional challenge to their utilization in field-emission devices.

Representative disclosures of nanostructure containing materials, devices and techniques include the following.

U.S. Pat. No. 6,630,772 (based on U.S. patent application Ser. No. 09/296,572 entitled "Device Comprising Carbon Nanotube Field Emitter Structure and Process for Forming Device"), the disclosure of which is incorporated herein by reference, in its entirety, discloses a carbon nanotube-based electron emitter structure.

U.S. patent application Ser. No. 09/351,537, now abandoned, entitled "Device Comprising Thin Film Carbon Nanotube Electron Field Emitter Structure", the disclosure of which is incorporated herein by reference, in its entirety, discloses a carbon nanotube field emitter structure having a high emitted current density.

U.S. Pat. No. 6,553,096 entitled "X-Ray Generating Mechanism Using Electron Field-Emission Cathode", the disclosure of which is incorporated herein by reference, in its entirety, discloses an x-ray generating device incorporating a cathode formed at least in part with a nanostructure-containing material.

U.S. Patent Application Publication No. US-2002/0094064, entitled "Large-Area Individually Addressable Multi-Beam X-Ray System and Method of Forming Same", the disclosure of which is incorporated herein by reference, in its entirety, discloses structures and techniques for generating x-rays which includes a plurality of stationary and individually electrically addressable field emissive electron sources.

U.S. Pat. No. 7,085,351 (based on U.S. patent application Ser. No. 10/358,160 entitled "Method and Apparatus for Controlling Electron Beam Current"), the disclosure of which is incorporated herein by reference, in its entirety, discloses an x-ray generating device which allows independent control of the electron emission current by piezoelectric, thermal, or optical means.

U.S. Patent Application Publication No. US-2002/0140336, entitled "Coated Electrode with Enhanced Electron Emission and Ignition Characteristics", the disclosure of which is incorporated herein by reference, in its entirety, discloses a coated electrode construction which incorporates nanostructure-containing materials.

U.S. Patent Application Publication. No. US-2004/0240616 (based on U.S. patent application Ser. No. 10/448,144, now abandoned, entitled "Nanomaterial Based Electron Field-Emission Cathodes for Vacuum and Gaseous Electronics"), the disclosure of which is incorporated herein by reference, in its entirety, discloses electronics incorporating field-emission cathodes based at least in part on nanostructure-containing materials.

U.S. Pat. No. 6,385,292 entitled "Solid State CT System and Method", the disclosure of which is incorporated herein by reference, in its entirety, disclose an x-ray source including a cathode formed from a plurality of addressable elements.

U.S. Patent Application Publication No. US-2004/0256975 (based on U.S. patent copending application Ser. No. 10/464,440, entitled "Improved Electrode and Associated Devices and Methods"), the disclosure of which is incorporated herein by reference, in its entirety, discloses a device including cathode incorporating a nanostructure-containing material embedded in a matrix material.

Therefore, processes which can readily incorporate carbon nanotubes, or other nanostructure-containing materials, formed by arc-discharge, laser ablation techniques, and the like, into adherent robust field emission devices while provide good electrical conductivity and a substantial number of nanotubes protruding toward the emission direction are desired.

SUMMARY OF THE INVENTION

The present invention provides fabrication and activation methods for a field emission devices, such as cathodes, which comprise a nanostructure-containing material composite. Nanostructure-containing materials are mixed with particles of other materials, such as (1) conducting materials including metal or metal alloys or (2) non-conducting materials including metal oxides or salts. The mixture is either (1) coated on the surface of a supporting structure or, (2) pressed, sintered or melted into a compact free-standing body. The coating can be either uniform or patterned with a predetermined structure. The free-standing body is processed to the desired geometry.

The coating or free-standing body may be the further processed to improve electron emission characteristics. One such method to improve the electron field emission properties is by electrochemical etching of the surface. A high frequency pulse can be used to further align the carbon nanotubes protruding from the composite surface.

Compared with thin carbon nanotube films, a coating formed as described above provides better adhesion and electrical conductivity between the nanostructure-containing material and the substrate.

According the one aspect, the present invention provides a method of forming an electron emitter that includes the steps of: (i) forming a nanostructure-containing material; (ii) forming a mixture of nanostructure-containing material and a matrix material; (iii) depositing a layer of the mixture onto at least a portion of at least one surface of a substrate by electrophoretic deposition; (iv) sintering or melting the layer thereby forming a composite; and (v) electrochemically etching the composite to remove matrix material from a surface thereof, thereby exposing nanostructure-containing material.

DETAILED DESCRIPTION OF THE INVENTION

Figure 1A:
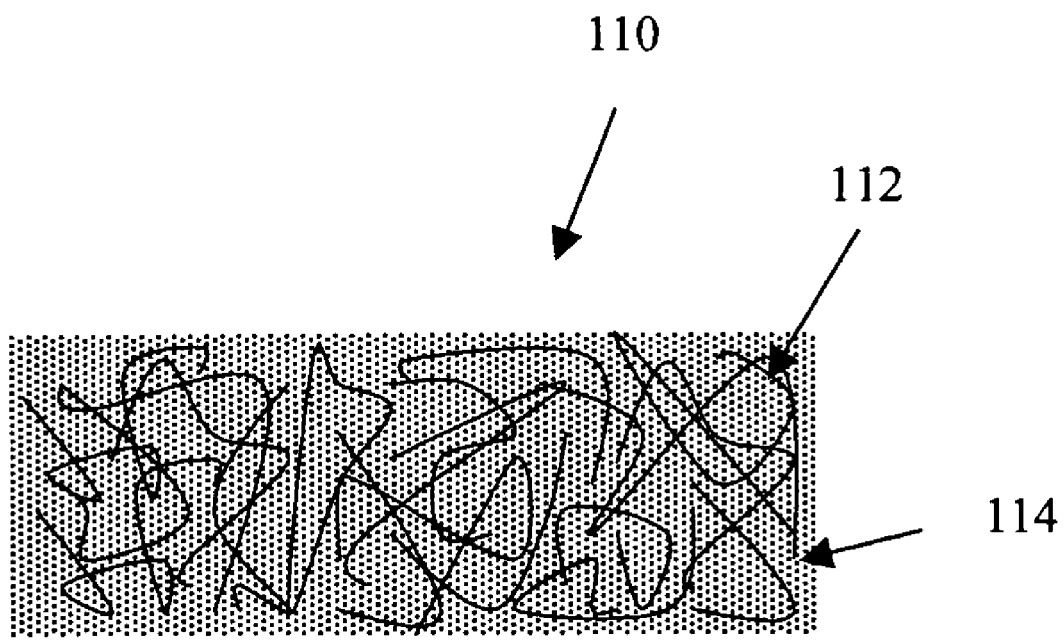
FIGS. 1A and 1B are schematic illustrations of matrix-nanotube composites according to the present invention.

Exemplary arrangements and techniques according to the present invention will now be described by reference to the drawing figures.

Generally, a method performed according to the principles of the present invention can include a combination of some or all of the following steps: (1) forming a raw nanostructure-containing material by a suitable technique, such as arc-discharge or laser ablation; (2) forming a mixture of nanostructure-containing material and a matrix material; (3) applying the mixture to a supporting surface or substrate, or forming the mixture into a free-standing body; (4) pressing the mixture to improve surface uniformity and/or flatness; (5) sintering or melting the mixture; (6) polishing and rinsing the sintered mixture; (6) etching the sintered mixture to remove matrix material and expose nanostructure material; (7) rinsing the etched mixture; (8) annealing the etched mixture; and (9) aligning the nanostructure material exposed by the etching procedure.

The process begins with pre-formed raw nanostructure-containing material, preferably with a high aspect ratio, or a nanotube-containing material, such as a carbon nanotube-containing material. This raw material can comprise at least one of single-walled carbon nanotubes, multi-walled carbon nanotubes, silicon, silicon oxide, germanium, germanium oxide, carbon nitrides, boron, boron nitride, dichalcogenide, silver, gold, iron, titanium oxide, gallanium oxide, indium phosphide, or magnetic particles such as Fe, Co, and Ni enclosed within nanostructures. According to a preferred embodiment, the raw carbon nanotube-containing material comprises single-walled carbon nanotubes. The carbon nanotubes can be formed by any suitable technique, such as the above-mentioned arc-discharge and laser ablation methods.

It is also contemplated by the present invention that raw materials be in the form of nanotube structures with a composition of $B_xC_yN_z$ (B=boron, C=carbon, and N=nitrogen), or nanotube or concentric fullerene structures with a composition $MS_2$ (M=tungsten, molybdenum, or vanadium oxide) can be utilized. These raw materials can be formed by any suitable technique, such as the above-mentioned arc-discharge technique.

The raw nanostructure-containing material can be subjected to purification. A number of techniques for purifying the raw materials are envisioned. For example, the raw material can be purified by reflux in a suitable solvent, such as a combination of peroxide ($H_2O_2$) and water, with an $H_2O_2$ concentration of 1-40% by volume, preferably about 20% by volume $H_2O_2$, with subsequent rinsing in $CS_2$ and then in methanol, followed by filtration. According to an exemplary technique, approximately 10-100 ml of peroxide is introduced into the medium for every 1-10 mg of nanotubes in the medium, and the reflux reaction is carried out at a temperature of 20-100° C. (see, e.g.—U.S. Pat. No. 6,553,096 (based on U.S. patent application Ser. No. 09/679,303)).

According to another alternative, the raw nanostructure-containing material is placed in a suitable liquid medium, such as an acidic medium, an organic solvent, or an alcohol, preferably methanol. The raw materials are kept in suspension within the liquid medium for several hours using a high-powered ultrasonic horn, while the suspension is passed through a microporous membrane. In another embodiment, the raw materials can be purified by oxidation in air or an oxygen environment at a temperature of 200-700° C. The impurities in the raw materials are oxidized at a faster rate than the nanotubes.

In yet another embodiment, the raw materials can be purified by liquid chromatography to separate the nanostructures/nanotubes from the impurities.

The nanostructures or nanotubes can also be subjected to a shortening process, which shortens the length thereof. For example, carbon nanotubes can be shortened by exposure to a strong acid. Alternatively, the nanotubes can be broken or shortened by mechanical milling techniques, such as ball milling.

The purified raw material, regardless of whether subjected to the above-described shortening process, can also optionally be annealed at a suitable temperature, such as 100° C.-1200° C. According to a preferred embodiment, the annealing temperature is 100° C.-600° C. The material is annealed for a suitable time period, such as approximately 1 to 60 minutes. According to a preferred embodiment, the material is annealed for approximately 1 hour. The material is annealed in a vacuum of about $10^{-2}$ torr, or at an even higher vacuum pressure. According to a preferred embodiment, the vacuum is about $5 \times 10^{-7}$ torr.

Next the nanostructure or nanotube materials are combined with a matrix material to form a mixture thereof. The matrix material can comprise conductive particles that can be electrochemically etched, such as metals, metal alloys, or mixtures thereof. Specific examples include: Fe, Mg, Cu, Co, Ni, Zn, Cr, Al, Au, Ag, Sn, Pb, W and Ti, or mixtures thereof.

Alternatively, the matrix material can comprise metal salts or oxides that decompose at elevated temperatures to render metals that can be electrochemically etched. Specific examples include: $Fe_2O_3$, $TiO_2$, MgO, and CaO, or mixtures thereof.

The nanostructure or nanotube material and the matrix material are combined according to a suitable technique. For example, the nanostructure or nanotube material can be ground or milled in a suitable solvent such as alcohol or water, to which the matrix material is added and ground or milled together to obtain a uniform mixture thereof in the form of a slurry or suspension. The uniformity of the slurry or suspension can be improved by the application of ultrasonic energy thereto.

This suspension can be used to form a free-standing body 110, as illustrated in FIG. 1A, which includes randomly-oriented nanostructures or nanotubes 112 and a matrix 114. Optionally, the slurry or suspension can be dried into a powder-like form, which can then be pressed or otherwise manipulated to form a suitable shape.

Alternatively, the slurry can be applied to a supporting surface or a substrate according to suitable technique. The substrate can be made of any suitable conductive material, such as metal, metal alloy, graphite, doped silicon. Alternatively, the substrate can be formed by a non-conductive material coated with a conductive layer, such as indium-tin oxide glasses, or glass or silicon wafer with deposited metal layer.

Figure 1B:
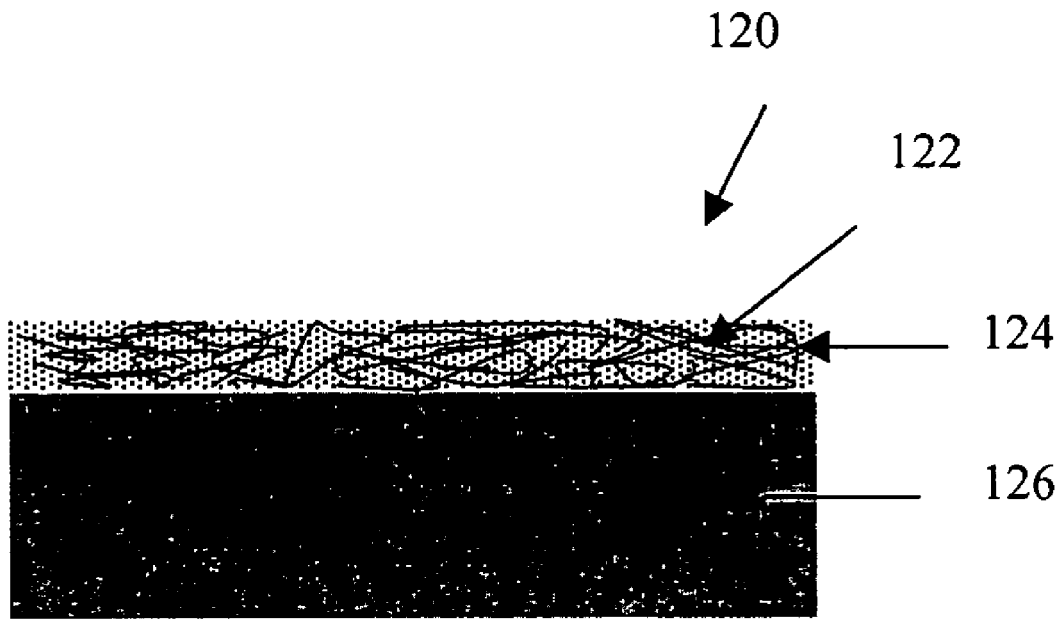

Suitable techniques for application of the slurry or suspension include suspension or solution casting, spraying, spin coating, screen printing, or electrophoretic deposition (EPD). As illustrated in FIG. 1B, a coated body 120 is formed and includes randomly-oriented nanostructures or nanotubes 122 embedded within a matrix 124, thereby forming a coating that is applied to a supporting surface or substrate 126.

The proportions of nanostructure or nanotube material and the matrix material present in the mixture can vary. According to one exemplary embodiment, the mixture can comprise 10% nanotubes and 90% matrix material, by weight.

According to a preferred embodiment, the mixture is deposited onto a supporting surface or substrate by EPD. Any suitable EPD process can be utilized. For specific details of exemplary techniques, see, e.g.—U.S. Patent Application Ser. No. 60/431,719, now U.S. Pat. No. 7,014,743, the content of which is incorporated herein by reference in its entirety.

Generally, such a technique includes formation of a suspension from the mixture, as discussed above. The concentration of the mixture contained in the suspension can vary. For example, the suspension can contain 0.4 grams of the nanostructure or nanotube/matrix material per 1 ml of liquid media.

Optionally, a charger is added to the suspension in order to facilitate electrophoretic deposition. Possible chargers include $MgCl_2$, $Mg(NO_3)_2$, $La(NO_3)_3$, $Y(NO_3)_3$, $AlCl_3$, and sodium hydroxide. Any suitable amount can be utilized. Amounts ranging from less than 1% up to 50%, by weight, as measured relative to the amount of nanostructure or nanotube/matrix material mixture contained in the suspension are feasible. According to a preferred embodiment, the suspension can contain less than 10% of the charger.

A plurality of electrodes are then introduced into the suspension. According to a preferred embodiment, two electrodes are utilized. One of the electrodes comprises the object upon which the mixture is to be deposited. Any suitable object or substrate material is envisioned, so long as it possesses the requisite degree of electrical conductivity. According to a preferred embodiment, the object is either metal or doped silicon.

An alternating current, or a direct current, is applied to the electrodes thereby producing an electrical field between the electrodes. This causes the particles of the mixture in the suspension to migrate toward and attach to the substrate electrode.

The electrophoretic deposition can be carried out at an elevated temperature or at room temperature. According to a preferred embodiment, the above-described electrophoretic deposition is carried at an elevated temperature. An elevated temperature on the order of 40-60° C. is envisioned.

The EPD can occur with application of either a direct current or an alternating current. For instance, when direct current is applied, the particular electrode (i.e.—anode or the cathode) to which the nanostructure material migrates can be controlled through the selection of the charger material. For example, the use of a negative charger, such as sodium hydroxide (NaOH) imparts a negative charge to the nanostructure material, thereby creating a tendency for the nanostructure material to migrate towards the positive electrode (cathode). Conversely, when a positive charger material is used, such as $MgCl_2$, a positive charge is imparted to the nanostructure material, thereby creating a tendency for the nanostructure material to migrate toward the negative electrode (anode).

When an alternating current field is used, the particular electrode to which the nanostructure material migrates can be controlled through the selection of alternating current frequency, dielectric constant of the liquid comparing to the nanostructure material, the field concentration, and the geometry of the electrodes.

Figure 2A:
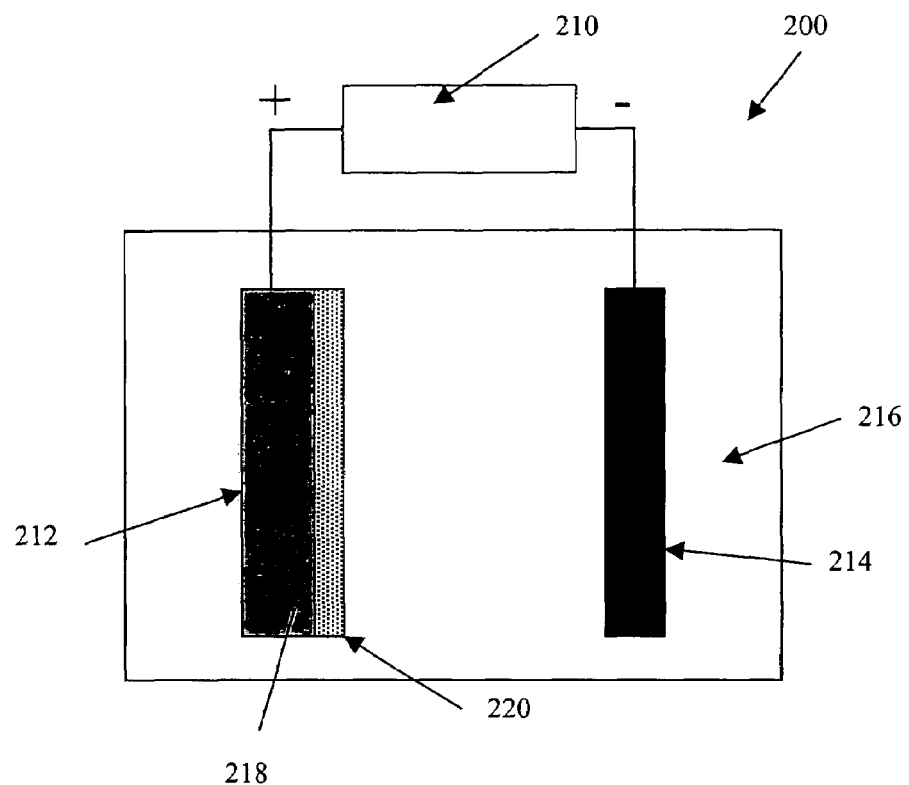
FIGS. 2A-2C are schematic illustrations of an etching procedure according to the present invention.

FIG. 2A schematically illustrates an arrangement for such an EPD process, the arrangement also being useful for electrochemical etching of the mixture, as will be described later. Generally, as illustrated in FIG. 2A, the arrangement 200 includes a power supply 210 having positive and negative terminals. The terminals attached to a pair of electrodes 212 and 214. The electrodes being immersed in a liquid medium 216. For the EPD process, the first electrode comprises the substrate 218 upon which a coating of the mixture 220 is to be deposited. The liquid medium 216 contains the particles of the mixture, and optionally a charger and/or other additional components. The particles are polarized by the electrical field created between the electrodes in a manner that tends to drive them toward the substrate 212 electrode and attach themselves to the surface thereof. The areas of the substrate electrode 212 upon which the mixture is deposited can be controlled by suitable masking techniques, thereby making the deposition of either uniform or patterned coating possible.

When a coating is formed by an EPD technique, the process of the present invention may optionally include a step whereby the as-deposited coating is pressed against a flat surface, such as a glass or metal plate, thereby improving the smoothness and uniformity of the surface.

The coating or free-standing body is then sintered in order to consolidate the nanostructure or nanotube/matrix composite. The sintering step can be carried out for example at 300 to 1200 degrees C for up to 3 hours (time) in a vacuum at $5 \times 10^{-7}$ torr.

When in the form of a free-standing body, the sintered body can optionally be sectioned or polished, and rinsed, to provide the body with one or more smooth surfaces.

Next the free-standing body or coated substrate formed as described above is preferably etched to remove a layer of matrix material from at least a portion of at least one surface of the body or coating.

The etching can be performed according to any suitable technique. However, it is preferred that the etching be achieved by an electrochemical technique. Electrochemical etching is preferred over other techniques such as acid etching, etc., because: (i) the etch rate can be easily controlled by controlling the electrical current generated by the power source, the etch time; (ii) electrochemical etching allows for greater selectivity with respect to the material being etched, and the material which should not be etched; and (iii) the electrochemical etching step can be easily integrated into a process that also includes EPD, since the basic equipment set-up is the same for both steps. In fact, according to the present invention a process incorporating both EPD and electrochemical etching imparts a certain synergy to the process, enabling superior control, convenience, and gains in efficiency, when compared to existing techniques.

The basic idea of electrochemical etching used in this invention is similar to that used in electrochemical plating. As shown in FIG. 2, the coated substrate forms a cathode 212 of the power supply 210. Another conducting plate 214, preferably stainless steel or carbon electrode is connected to the negative electrode of the power supply 210. The two electrodes 212, 214 are immersed in an electrochemical bath 216.

The liquid medium or bath 216 can be an aqueous, or a non-aqueous solution of acids, bases or the salts containing the elements of the materials to be etched, i.e.—of the matrix material. In principle, any bath that is used to electrochemically plate a metal or metal alloy can be used to electrochemically etch a metal or alloy. For example, if the coating 220 comprises a Fe/carbon nanotube composite, the electrochemical bath 216 used for plating Fe can be used to etch a Fe layer away from the Fe/carbon nanotube composite coating 220. During electrochemical etching, the Fe atoms in the Fe/carbon nanotube composite get oxidized and dissolved into the plating bath 216 at the positive electrode 212 and the same number of Fe atoms will be deposited at the negative electrode 214 to attain electrical neutrality. The carbon materials are very stable during electrochemical reaction so that they typically will survive the etching process.

The etching step can be performed at room temperature or at an elevated temperature. According to a preferred embodiment, the electrochemical etching step is performed at an elevated temperature on the order of 30-90° C.

As an example, if the matrix material is Fe, the etching bath could be an aqueous solution of ferrous sulfate ($FeSO_4$) at a concentration of 240 g/L. Preferably, the pH value of the bath is between 2.8-3.5 and the temperature of the bath is between 32-66° C. The current density is preferably between 20-40 A/ft$^2$ and the voltage is between 1-20V.

Figure 2B:
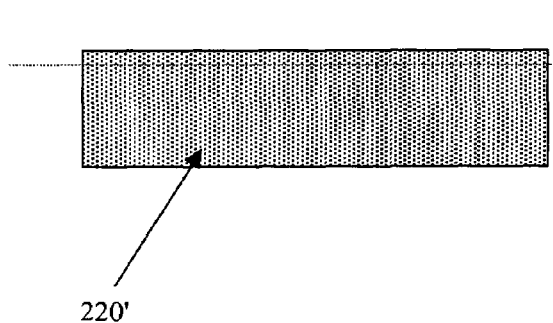
Figure 2C:
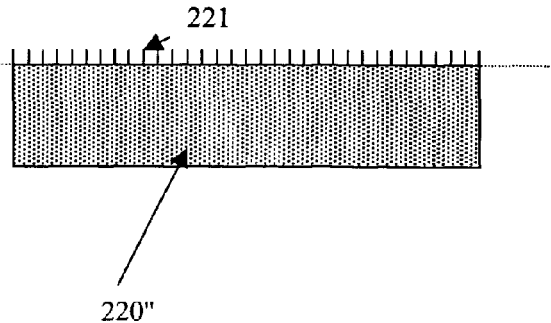

FIGS. 2B and 2C schematically illustrate a coated substrate before etching 220', and a coated substrate after etching 220", respectively. As illustrated in FIG. 2C, the etching step exposes a number of nanostructures or nanotubes 221 at the desired emission surface of the coated substrate.

After electrochemical etching, the structure(s) are optionally rinsed thoroughly using de-ionized water and alcohol. They are then optionally annealed under a dynamic vacuum to get rid of the moisture and solvents introduced into the structures during processing. Suitable exemplary annealing conditions comprise 850° C. at $5 \times 10^{-7}$ for 1.5 hours.

The coated substrate or free-standing body can be further processed in a manner which promotes alignment of the nanostructures or nanotubes in the direction of electron emission. Numerous techniques are feasible. According to an exemplary embodiment, the coated substrate or free-standing body can be subjected to a high frequency voltage pulse. The voltage of the pulse is from a few volts to several thousand volts depending on the distance between the cathode and the anode. The frequency is from a few KHz to the MHz range. Preferably, a few MHz. The time of the processes can be up to a few hours but preferably just a few minutes. The alignment step can be performed at any suitable time in the process, preferably after exposure of the nanostructures or nanotubes by etching, and prior to powering up the coated substrate or free-standing body for electron emission.

Numerous modifications and extrapolations are possible within the basic framework of a method performed as described above. Exemplary, non-limiting, additional methods performed according to the principles of the present invention outlined above will now be described.

Figure 3A:
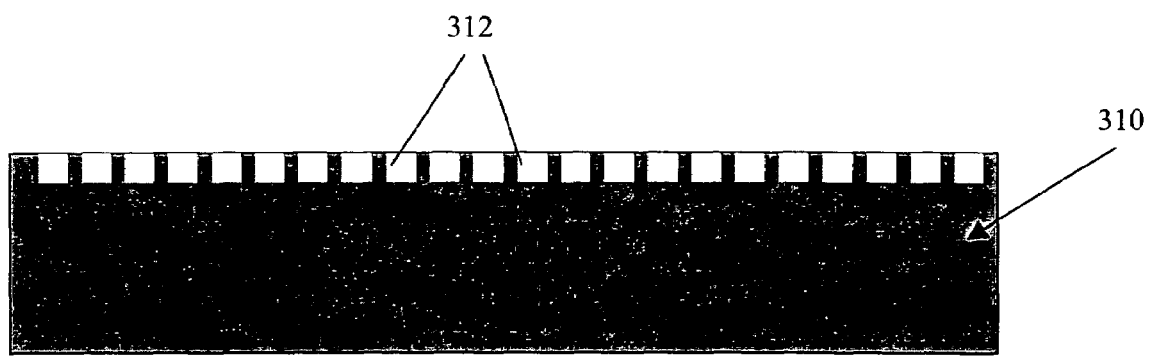
FIGS. 3A-3D are schematic illustrations of a technique for forming a substrate (e.g.—cathode) with an array of matrix-nanotube composite structures according to the invention.
Figure 3B:
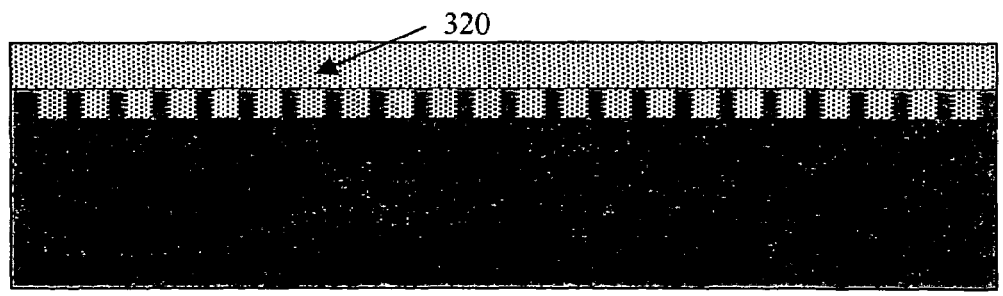
Figure 3C:
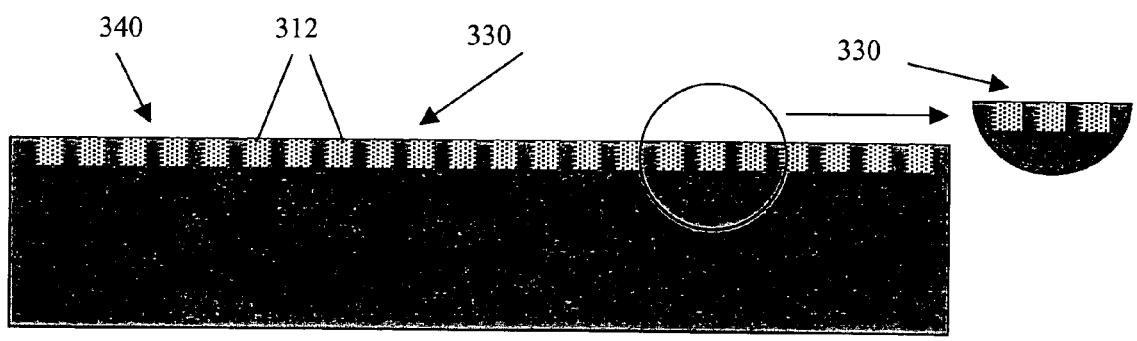
Figure 3D:
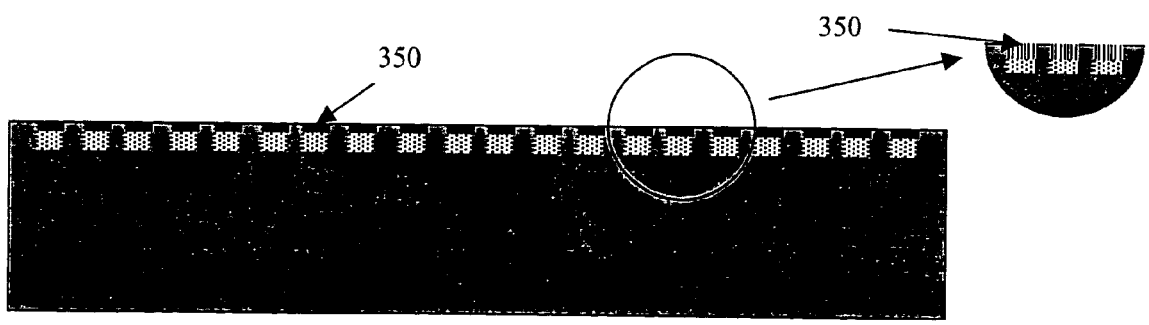

Field emission cathodes with an fine pixel size or matrix of emission pixels can also be made by the above method. As shown in FIGS. 3A-3D, a metal/carbon nanotube paste 320 can be deposited on a waffled substrate 310 by a doctor-blade or similar device, spin coating, screen-printing or electrophoresis. The coated paste is sintered or melted under proper conditions thereby rendering small deposits of nanotube-metal composite 330. The top surface 340 of the coated substrate is polished and rinsed thoroughly using alcohol. As shown in FIG. 3C, the metal/carbon nanotube composite is limited to cavities 312. The structures are then etched and rinsed, preferably by the above-described electrochemical technique, so that these areas have exposed carbon nanotube emitters 350 (FIG. 3D). The exposed nanotubes may also be subjected to an alignment treatment, as discussed above.

Figure 4A:
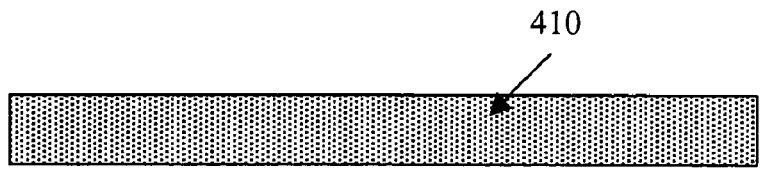
FIGS. 4A-4E are schematic illustrations of an alternative technique of forming a substrate (e.g.—cathode) with an array of fine focal spots for field emission according to the invention.
Figure 4B:
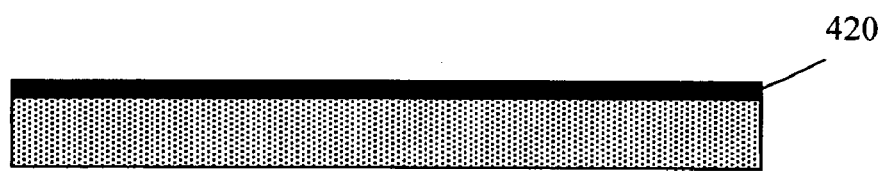
Figure 4C:
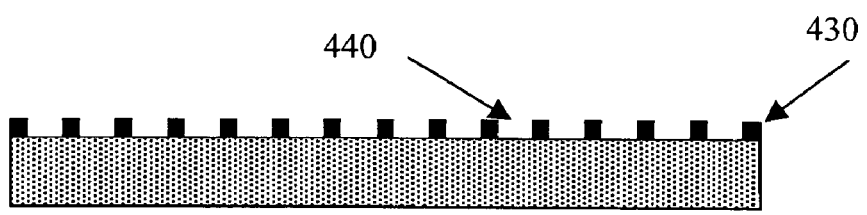
Figure 4D:
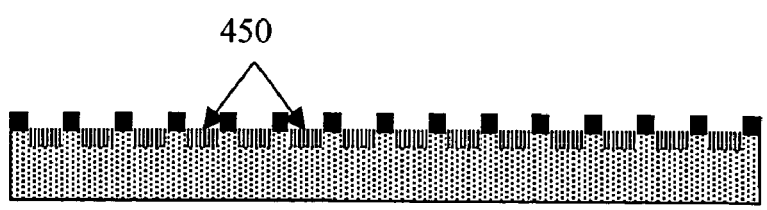
Figure 4E:
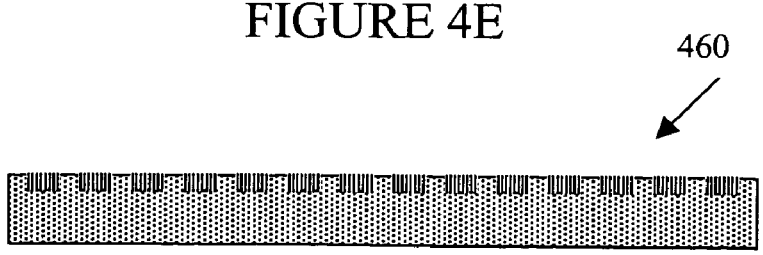

Similar structures can also be made by photolithography techniques, as shown in FIGS. 4A-4E. A photoresist layer 420 is deposited on the metal/carbon nanotube composite pellet or film 410. After developing, a patterned structure 430 is formed having open areas 440. The pellet or film 410 is electrochemically etched, at these areas exposed to the bath by openings 440. Consequently, carbon nanotube emitters 450 are left exposed. The exposed nanotubes 450 may also be subjected to an alignment treatment, as previously discussed. The photoresistor layer 430 is stripped away and a patterned cathode 460 is formed. Because photolithography techniques can pattern very small features, a cathode with extremely fine focal spots, as shown in FIG. 4E, can be made easily by the above-described process.

Figure 5A:
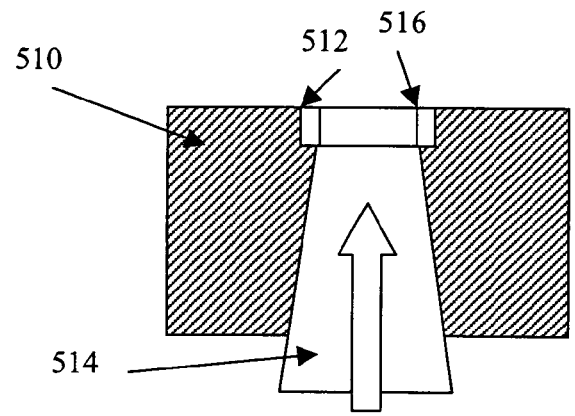
FIGS. 5A-5C are schematic illustrations of an alternative technique of providing a substrate (e.g.—cathode) with fine focal spots for field emission according to the invention.
Figure 5B:
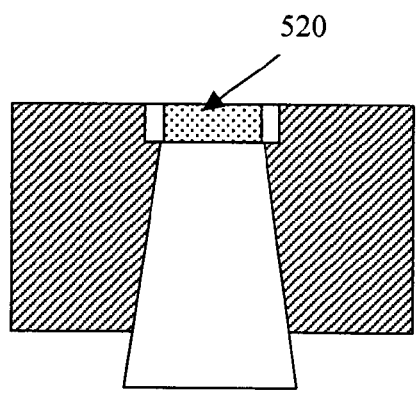
Figure 5C:
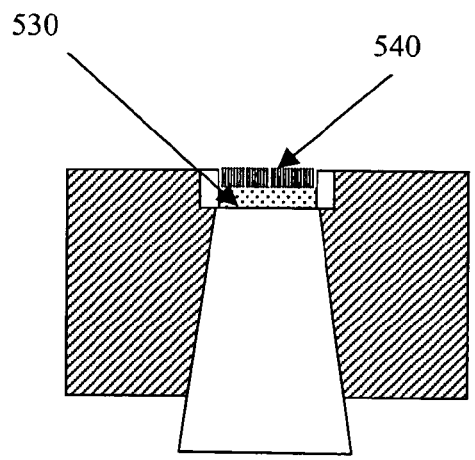

Field emission cathodes with a fine focal spot or arrays of fine focal spots can also be made by a process such as the one shown in FIGS. 5A-5C. A substrate comprises a disk 510 with a hole 512, and a cone 514 with a hole 516. A metal/carbon nanotube paste 520 is filled into the hole 516 according to the above-described techniques, as shown in FIG. 5B. Preferably, the filled hole(s) are vacuum annealed at high temperature thereby forming deposits of nanotube-metal composite 530. The surface(s) of the composite 530 are then etched electrochemically to make sure that a significant number of carbon nanotubes 540 are exposed from the metal matrix as shown in FIG. 5C. Optionally, the exposed nanotubes are subjected to the previously described alignment process step. If necessary, the front surfaces 550 are polished and further cleaned so that the emitting materials only exist in the holes. The metal/carbon nanotube paste can also be filled into the structures from the back as shown by the large arrow in FIG. 5A. The front surfaces 550 and the side surfaces 560 can be covered before filling by using Para-film or other films. They can be peeled off after the filling process so that the front (emitting) surface will only have emitting materials in the hole 516 areas.

Figure 6A:
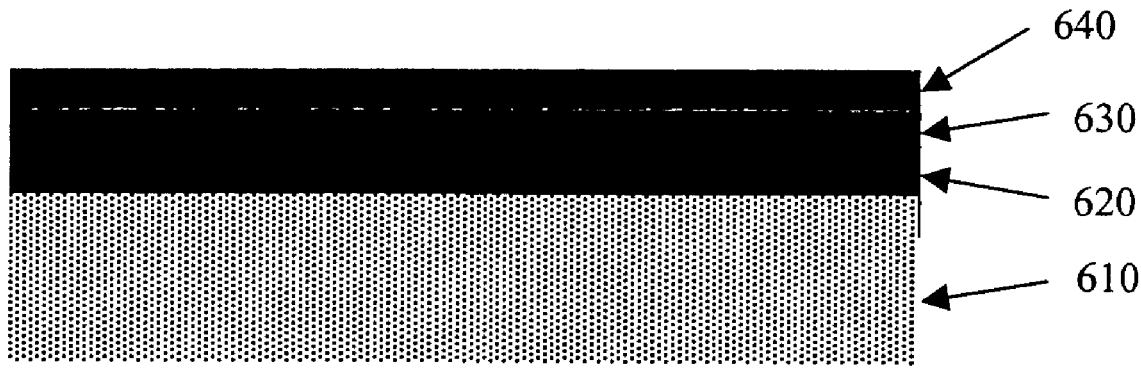
FIGS. 6A-6E are schematic illustrations of a technique for forming a triode field emission structure according to the present invention.
Figure 6B:
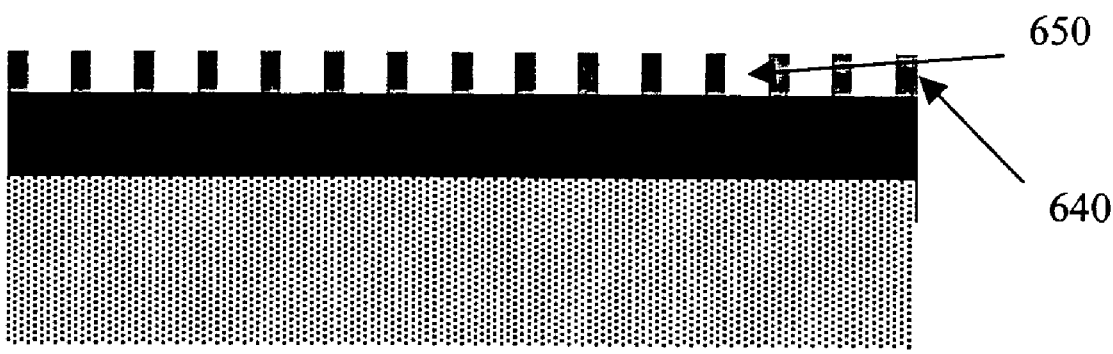
Figure 6C:
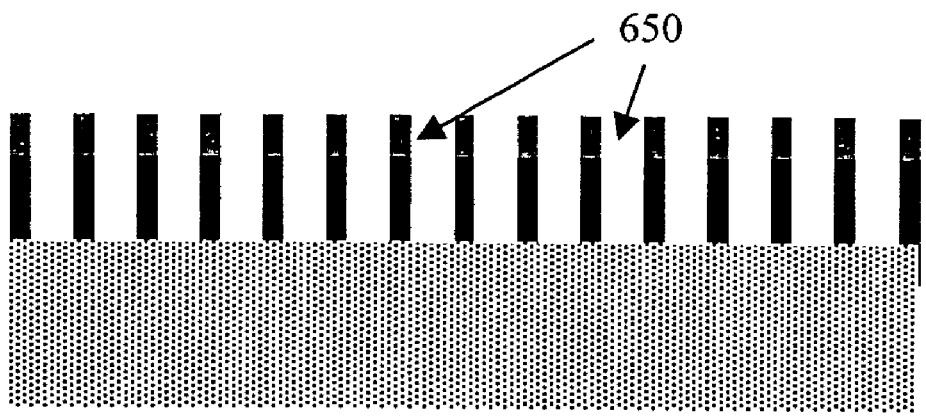
Figure 6D:
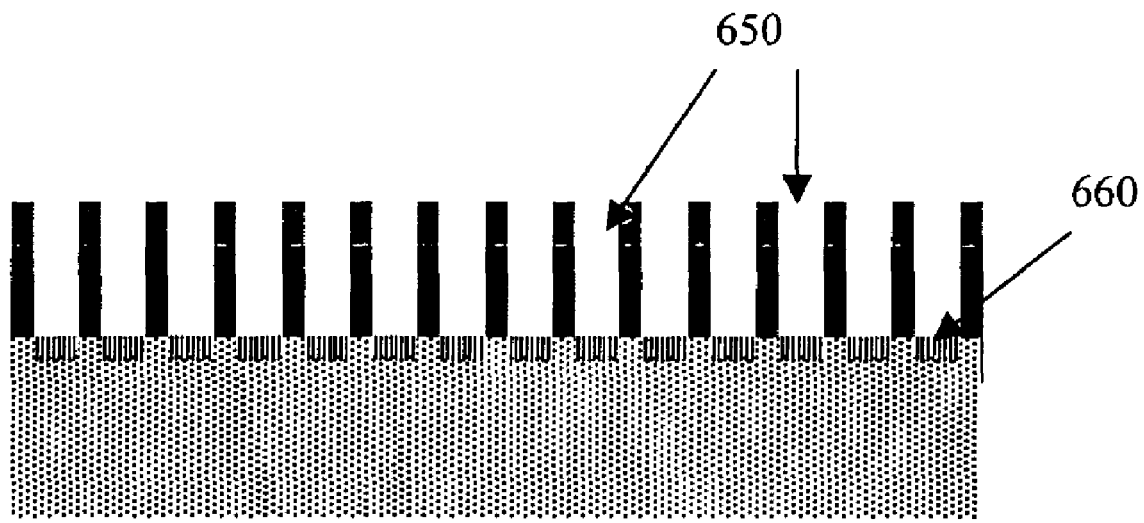
Figure 6E:
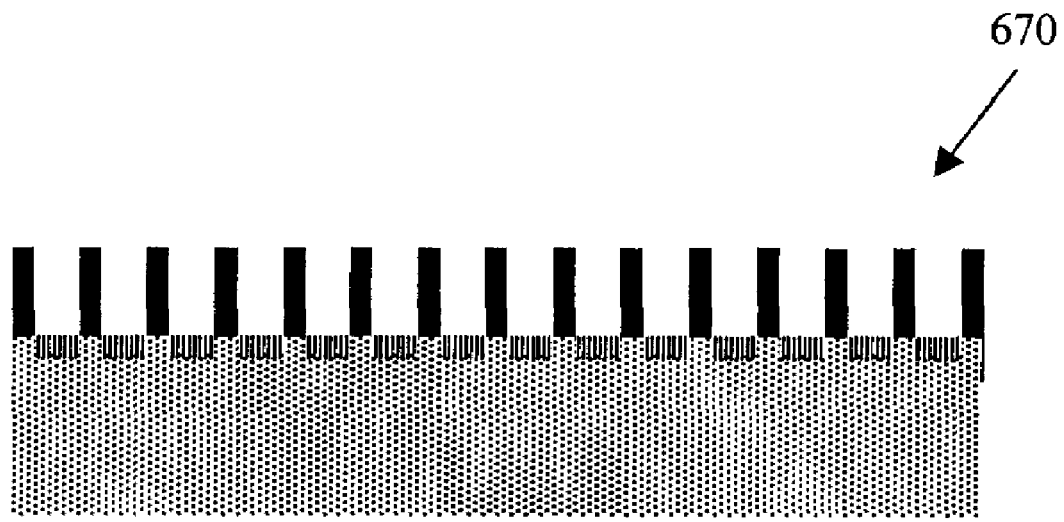

A triode field emission structure can also be made by photolithography techniques, as shown in FIGS. 6A-6E. A dielectric layer 620 is deposited onto a carbon nanotube/metal composite film or body 610. A conducting layer 630 is deposited on the dielectric layer 620. A photoresist layer 640 is deposited on the conducting layer 630 and is exposed and developed. A patterned structure with openings 650 as shown in FIGS. 6B-6E can be made by normal photolithography techniques. A layer of the nanotube/metal composite 610 can be etched away by electrochemical etching thereby exposing the nanotube emitters 660 at the surface thereof (FIG. 6D). The exposed nanotubes 660 can optionally be subjected to an alignment step. The remaining photoresist layer is stripped away. The resulting triode field emission cathode 670 is shown in FIG. 6E.

The above-described techniques can be used to form electron emitters for use in a number of different devices such as flat-panel displays, microwave vacuum tubes, portable x-ray devices, gas discharge tubes, etc.

While the present invention has been described by reference to the above-mentioned embodiments, certain modifications and variations will be evident to those of ordinary skill in the art. Therefore, the present invention is limited only by the scope and spirit of the appended claims.

I claim:

1. A method of forming an electron emitter, the method comprising the steps of:
    (i) forming a nanostructure-containing material;
    (ii) forming a mixture comprising nanostructure-containing material and a matrix material;
    (iii) depositing a layer of the mixture onto at least a portion of at least one surface of a substrate by electrophoretic deposition;
    (iv) sintering or melting the layer thereby forming a composite; and
    (v) electrochemically etching the composite to remove matrix material from a surface thereof, thereby exposing nanostructure-containing material.

2. The method of claim 1, further comprising the step of: pressing the layer after step (iii), thereby improving surface smoothness of the layer.

3. The method of claim 2, further comprising the step of: polishing and rinsing a surface of the composite subsequent to step (iv).

4. The method of claim 3, further comprising the step of: rinsing the composite subsequent to step (v).

5. The method of claim 4, further comprising the step of: annealing the composite subsequent to step (v).

6. The method of claim 5, further comprising the step of: aligning at least a portion of the expose nanostructure material.

7. The method of claim 1, wherein step (i) comprises forming the nanostructure-containing material by laser-ablation or arc-discharge techniques, and the nanostructure-containing material comprises single-walled carbon nanotubes.

8. The method of claim 1, further comprising the step of purifying the nanostructure-containing material prior to step (ii).

9. The method of claim 1, wherein the nanostructure-containing material comprises nanotubes, and the method further comprises the step of shortening the length of the nanotubes prior the step (ii).

10. The method of claim 9, wherein the nanotubes are shortened by exposure to an acid or by milling.

11. The method of claim 1, wherein the matrix material comprises: Fe, Mg, Cu, Co, Ni, Zn, Cr, Al, Au, Ag, Sn, Pb, W, Ti, or mixtures thereof.

12. The method of claim 1, wherein the matrix material added at step (ii) comprises: $Fe_2O_3$, $TiO_2$, MgO, CaO, or mixtures thereof.

13. The method of claim 1, wherein step (ii) comprises milling the nanostructure-containing material and matrix material, thereby forming a uniform mixture.

14. The method of claim 1, wherein step (ii) comprises forming a suspension of nanostructure-containing material and matrix material.

15. The method of claim 1, wherein the substrate comprises: metal, metal alloy, doped silicon, graphite, or a non-conductive material coated with a layer of indium-tin-oxide glass or metal.

16. The method of claim 1, wherein step (iii) further comprises forming a suspension of the mixture, adding a charger to the suspension, introducing the substrate and a counter electrode into the suspension, connecting the substrate and counter electrode to a power source, and applying current to the substrate and counter electrode thereby causing polarization of the mixture in a matter that causes the mixture to migrate toward and attach to an exposed surface of the substrate.

17. The method of claim 16, wherein step (iii) further comprising masking at least a portion of the substrate thereby shielding the portion from the suspension.

18. The method of claim 1, wherein step (iii) is performed at a temperature of 20-50° C.

19. The method of claim 1, wherein step (iv) is performed at a temperature of 300-1200° C.

20. The method of claim 1, wherein the at least one surface of the substrate comprises a waffled surface with a plurality of cavities.

21. The method of claim 1 further comprising the steps of:
applying a photoresist layer to the at least one surface of the substrate and developing the photoresist layer in a manner which forms a pattern of openings therein, prior to step (iii), wherein the openings expose selected portions of the at least one surface of the substrate to the mixture in step (iii).

22. The method of claim 21, further comprising the step of:
removing the photoresist material from the at least one surface of the substrate subsequent to step (iii).

23. The method of claim 1, wherein the substrate comprises a disk and a cone, each with a hole formed therein for receipt of the mixture.

24. The method of claim 1, further comprising, prior to step (iii), the steps of:
depositing a dielectric layer on the at least one surface of the substrate;
depositing a conducting layer on the dielectric layer;
depositing a photoresist layer on the conducting layer;
developing the photoresist layer in a manner which forms a pattern of openings therein; and
removing the portions of the dielectric layer and conducting layer exposed by the pattern of openings.

25. The method of claim 24, further comprising the step of: removing the photoresist material subsequent to step (iii).

* * * * *